(12) United States Patent
Naganna et al.

(10) Patent No.: US 11,741,957 B2
(45) Date of Patent: Aug. 29, 2023

(54) CHATBOT WITH AUGMENTED REALITY BASED VOICE COMMAND NAVIGATION

(71) Applicant: International Business Machines Corporation, Armonk, NY (US)

(72) Inventors: Soma Shekar Naganna, Bangalore (IN); Sarbajit K. Rakshit, Kolkata (IN); Abhishek Seth, Deoband (IN)

(73) Assignee: International Business Machines Corporation, Armonk, NY (US)

( * ) Notice: Subject to any disclaimer, the term of this patent is extended or adjusted under 35 U.S.C. 154(b) by 301 days.

(21) Appl. No.: 17/350,010

(22) Filed: Jun. 17, 2021

(65) Prior Publication Data

US 2022/0406302 A1 Dec. 22, 2022

(51) Int. Cl.
| | |
|---|---|
| *G10L 15/22* | (2006.01) |
| *G06F 3/01* | (2006.01) |
| *G06T 11/00* | (2006.01) |
| *H04L 51/02* | (2022.01) |
| *G06F 3/16* | (2006.01) |
| *G06N 20/00* | (2019.01) |

(52) U.S. Cl.
CPC .............. *G10L 15/22* (2013.01); *G06F 3/017* (2013.01); *G06F 3/167* (2013.01); *G06T 11/00* (2013.01); *H04L 51/02* (2013.01); *G06N 20/00* (2019.01); *G10L 2015/223* (2013.01); *G10L 2015/228* (2013.01)

(58) Field of Classification Search
CPC ........... G10L 15/22; G06F 3/017; G06F 3/167
See application file for complete search history.

(56) References Cited

U.S. PATENT DOCUMENTS

| | | | |
|---|---|---|---|
| 8,938,394 B1* | 1/2015 | Faaborg | G10L 15/22 704/274 |
| 2014/0168243 A1* | 6/2014 | Huang | G06T 1/20 345/522 |
| 2016/0337827 A1 | 11/2016 | Bjontegard | |
| 2017/0371885 A1 | 12/2017 | Aggarwal | |
| 2019/0371342 A1 | 12/2019 | Tukka | |

FOREIGN PATENT DOCUMENTS

IN 201741002929 A 7/2018

OTHER PUBLICATIONS

"Method and System for Recalling Complete or Partial Voice Command Submitted to AI Voice Assistance System", An IP.com Prior Art Database Technical Disclosure, Authors et al.: Disclosed Anonymously, IP.com No. IPCOM000261525D, IP.com Electronic Publication Date: Mar. 12, 2020, 5 pages.

* cited by examiner

*Primary Examiner* — Ibrahim Siddo
(74) *Attorney, Agent, or Firm* — David B. Woycechowsky

(57) ABSTRACT

A method for recording a plurality of augmented reality (AR) sessions between a set of user(s) and an AR computer system, receiving first user input, through the AR computer system and from a first user, identifying a first AR session of the plurality of AR sessions, and presenting at least a portion of the recording of the first AR session on the AR computer system for the first user.

18 Claims, 4 Drawing Sheets

400

```
MENU

WAKING UP SESSION, JULY 1, 2020
        - TURN OFF ALARM COMMAND
        - TURN ON LIGHT COMMAND
        - HEAT WASHROOM COMMAND

LUNCH AT RESTAURANT SESSION, AUG 1, 2020
        - ORDER FOOD MENU CALL UP
        - VARIOUS FOOD ORDERING COMMANDS

RAINY DAY SESSION, NOV 6, 2020
        - SUMMON UMBRELLA COMMAND
        - CLOSE CONVERTIBLE CAR TOP COMMAND

SUNNY DAY SESSION
        - APPLY TINT TO AR GOGGLES
        - RECALCULATE PERSONAL WATER DRINKING TARGETS
```

CHATBOT WITH AUGMENTED REALITY BASED VOICE COMMAND NAVIGATION

BACKGROUND

The present invention relates generally to the field of voice based chatbots (VBCs, sometimes also referred to as virtual assistants), and more particularly to voice based chatbots to be used within an augmented reality computing environment by a user who communicates with the VBC.

The Wikipedia entry for "chatbot" (as of Feb. 2, 2021) states as follows: "A chatbot is a software application used to conduct an on-line chat conversation via text or text-to-speech, in lieu of providing direct contact with a live human agent . . . . Chatbots are used in dialog systems for various purposes including customer service, request routing, or information gathering. While some chatbot applications use extensive word-classification processes, natural language processors, and sophisticated AI, others simply scan for general keywords and generate responses using common phrases obtained from an associated library or database. Most chatbots are accessed on-line via website popups or through virtual assistants." (footnote(s) omitted)

The Wikipedia entry for "Virtual Assistant" (as of Feb. 2, 2021) states as follows: "An intelligent virtual assistant (IVA) or intelligent personal assistant (IPA) is a software agent that can perform tasks or services for an individual based on commands or questions. Sometimes the term "chatbot" is used to refer to virtual assistants generally or specifically accessed by online chat. In some cases, online chat programs are exclusively for entertainment purposes. Some virtual assistants are able to interpret human speech and respond via synthesized voices. Users can ask their assistants questions, control home automation devices and media playback via voice, and manage other basic tasks such as email, to-do lists, and calendars with verbal [spoken] commands." (footnote(s) omitted)

As the two terms are used in this document, "chatbot" and "virtual assistant" are used interchangeably and mean the same thing, notwithstanding any subtle definitional differences that may be indicated by the Wikipedia quotation in the previous paragraph.

The Wikipedia entry for "Augmented Reality" (as of Feb. 2, 2021) states as follows: "Augmented reality (AR) is an interactive experience of a real-world environment where the objects that reside in the real world are enhanced by computer-generated perceptual information, sometimes across multiple sensory modalities, including visual, auditory, haptic, somatosensory and olfactory. AR can be defined as a system that fulfills three basic features: a combination of real and virtual worlds, real-time interaction, and accurate 3D registration of virtual and real objects. The overlaid sensory information can be constructive ([that is] additive to the natural environment), or destructive ([that is] masking of the natural environment). This experience is seamlessly interwoven with the physical world such that it is perceived as an immersive aspect of the real environment. In this way, augmented reality alters one's ongoing perception of a real-world environment, whereas virtual reality completely replaces the user's real-world environment with a simulated one. Augmented reality is related to two largely synonymous terms: mixed reality and computer-mediated reality." (footnote(s) omitted)

SUMMARY

According to an aspect of the present invention, there is a method, computer program product and/or system that performs the following operations (not necessarily in the following order): (i) recording a plurality of augmented reality (AR) sessions between a set of user(s) and an AR computer system, with each recorded session including information indicative of: (a) a set of voice command(s) uttered during the session, and (b) respective responses, by the AR computer system, to each voice command of the set of voice command(s); (ii) receiving first user input, through the AR computer system and from a first user, identifying a first AR session of the plurality of AR sessions; and (iii) presenting at least a portion of the recording of the first AR session on the AR computer system for the first user.

DETAILED DESCRIPTION

Figure 1:
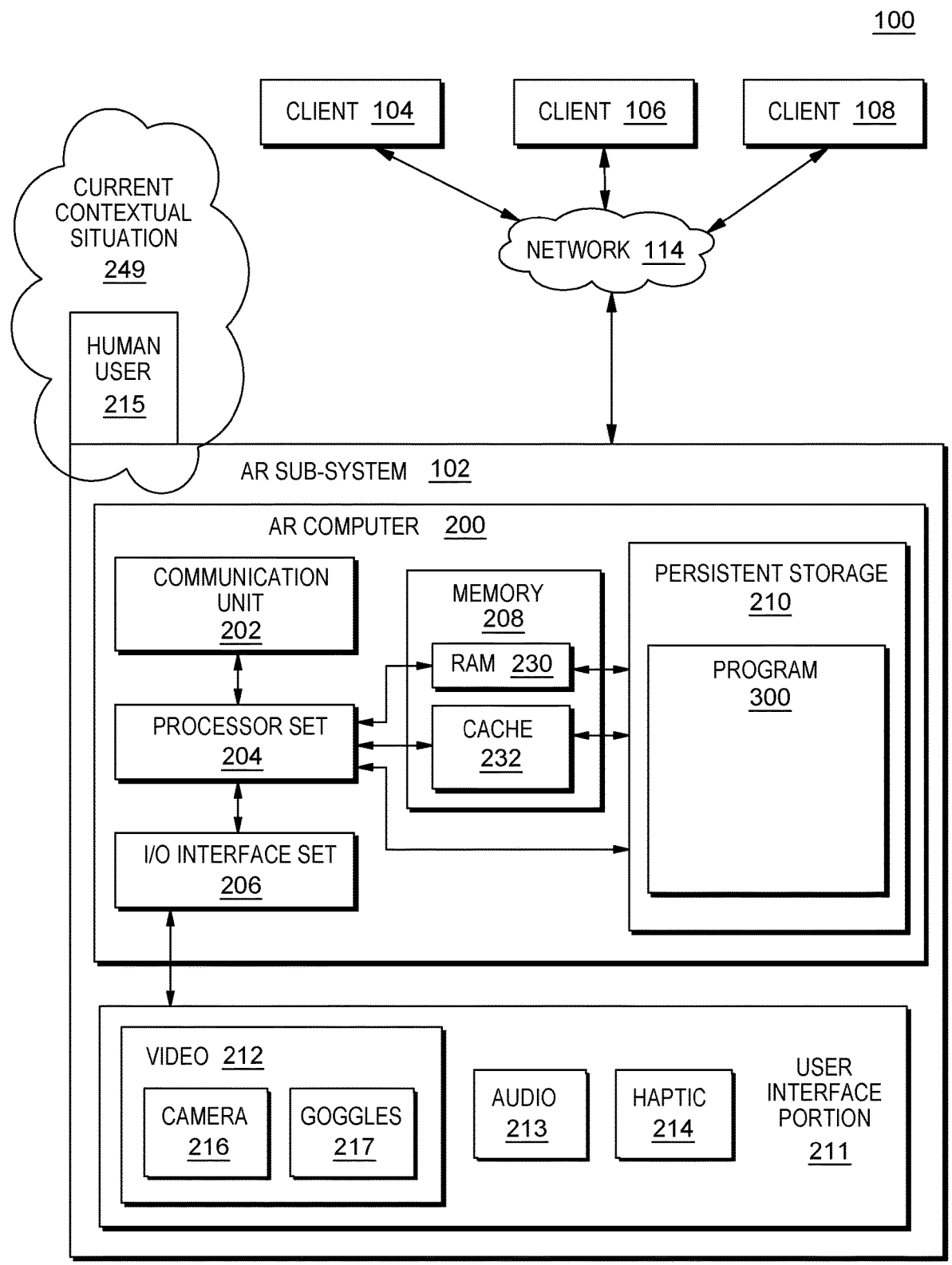
FIG. 1 is a block diagram view of a first embodiment of a system according to the present invention.

An AR system can be commanded to play back audio and video from previous user sessions so that the user can have her recall refreshed with respect to voice commands that were: (i) performed during a previous session; and (ii) needed by the user in the user's current context. Session playback can be variable speed so that previous instance of the voice command currently of interest can be quickly found. This Detailed Description section is divided into the following subsections: (i) The Hardware and Software Environment; (ii) Example Embodiment; (iii) Further Comments and/or Embodiments; and (iv) Definitions.

I. The Hardware and Software Environment

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (for example, light pulses passing through a fiber-optic cable), or electrical signals transmitted through a wire.

A "storage device" is hereby defined to be anything made or adapted to store computer code in a manner so that the computer code can be accessed by a computer processor. A storage device typically includes a storage medium, which is the material in, or on, which the data of the computer code is stored. A single "storage device" may have: (i) multiple discrete portions that are spaced apart, or distributed (for example, a set of six solid state storage devices respectively located in six laptop computers that collectively store a single computer program); and/or (ii) may use multiple storage media (for example, a set of computer code that is partially stored in as magnetic domains in a computer's non-volatile storage and partially stored in a set of semiconductor switches in the computer's volatile memory). The term "storage medium" should be construed to cover situations where multiple different types of storage media are used.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

As shown in FIG. 1, networked computers system 100 is an embodiment of a hardware and software environment for use with various embodiments of the present invention. Networked computers system 100 includes: augmented reality (AR) subsystem 102 (sometimes herein referred to, more simply, as subsystem 102); client subsystems 104, 106, 108; and communication network 114. AR subsystem subsystem 102 includes: AR computer 200; communication unit 202; processor set 204; input/output (I/O) interface set 206; memory 208; persistent storage 210; user interface portion 211; random access memory (RAM) 230; cache 232; and program 300. User interface portion 211 includes: video portion 212 (including AR goggles 217 and camera 216); audio portion 213; and haptic portion 214. AR subsystem is worn by human user 215 who is located in current contextual situation 249.

Subsystem 102 may be a laptop computer, tablet computer, netbook computer, personal computer (PC), a desktop computer, a personal digital assistant (PDA), a smart phone, or any other type of computer (see definition of "computer" in Definitions section, below). Program 300 is a collection of machine readable instructions and/or data that is used to create, manage, and control certain software functions that will be discussed in detail, below, in the Example Embodiment subsection of this Detailed Description section.

Subsystem 102 is capable of communicating with other computer subsystems via communication network 114. Network 114 can be, for example, a local area network (LAN), a wide area network (WAN) such as the Internet, or a combination of the two, and can include wired, wireless, or fiber optic connections. In general, network 114 can be any combination of connections and protocols that will support communications between server and client subsystems.

Subsystem 102 is shown as a block diagram with many double arrows. These double arrows (no separate reference numerals) represent a communications fabric, which provides communications between various components of subsystem 102. This communications fabric can be implemented with any architecture designed for passing data and/or control information between processors (such as microprocessors, communications, and network processors, etc.), system memory, peripheral devices, and any other hardware components within a computer system. For example, the communications fabric can be implemented, at least in part, with one or more buses.

Memory 208 and persistent storage 210 are computer-readable storage media. In general, memory 208 can include any suitable volatile or non-volatile computer-readable storage media. It is further noted that, now and/or in the near future: (i) various kinds of known external device(s) may be able to supply, some or all, memory for subsystem 102; and/or (ii) devices external to subsystem 102 may be able to provide memory for subsystem 102. Both memory 208 and persistent storage 210: (i) store data in a manner that is less transient than a signal in transit; and (ii) store data on a tangible medium (such as magnetic or optical domains). In this embodiment, memory 208 is volatile storage, while persistent storage 210 provides nonvolatile storage. The media used by persistent storage 210 may also be removable. For example, a removable hard drive may be used for persistent storage 210. Other examples include optical and magnetic disks, thumb drives, and smart cards that are inserted into a drive for transfer onto another computer-readable storage medium that is also part of persistent storage 210.

Communications unit 202 provides for communications with other data processing systems or devices external to subsystem 102. In these examples, communications unit 202 includes one or more network interface cards. Communications unit 202 may provide communications through the use of either or both physical and wireless communications links. Any software modules discussed herein may be downloaded to a persistent storage device (such as persistent storage 210) through a communications unit (such as communications unit 202).

In this embodiment, program 300 is stored in persistent storage 210 for access and/or execution by one or more computer processors of processor set 204, usually through one or more memories of memory 208. It will be understood by those of skill in the art that program 300 may be stored in a more highly distributed manner during its run time and/or when it is not running. Program 300 may include both machine readable and performable instructions and/or substantive data (that is, the type of data stored in a database). In this particular embodiment, persistent storage 210 includes a magnetic hard disk drive. To name some possible variations, persistent storage 210 may include a solid state hard drive, a semiconductor storage device, read-only memory (ROM), erasable programmable read-only memory (EPROM), flash memory, or any other computer-readable storage media that is capable of storing program instructions or digital information.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

II. Example Embodiment

Figure 2:
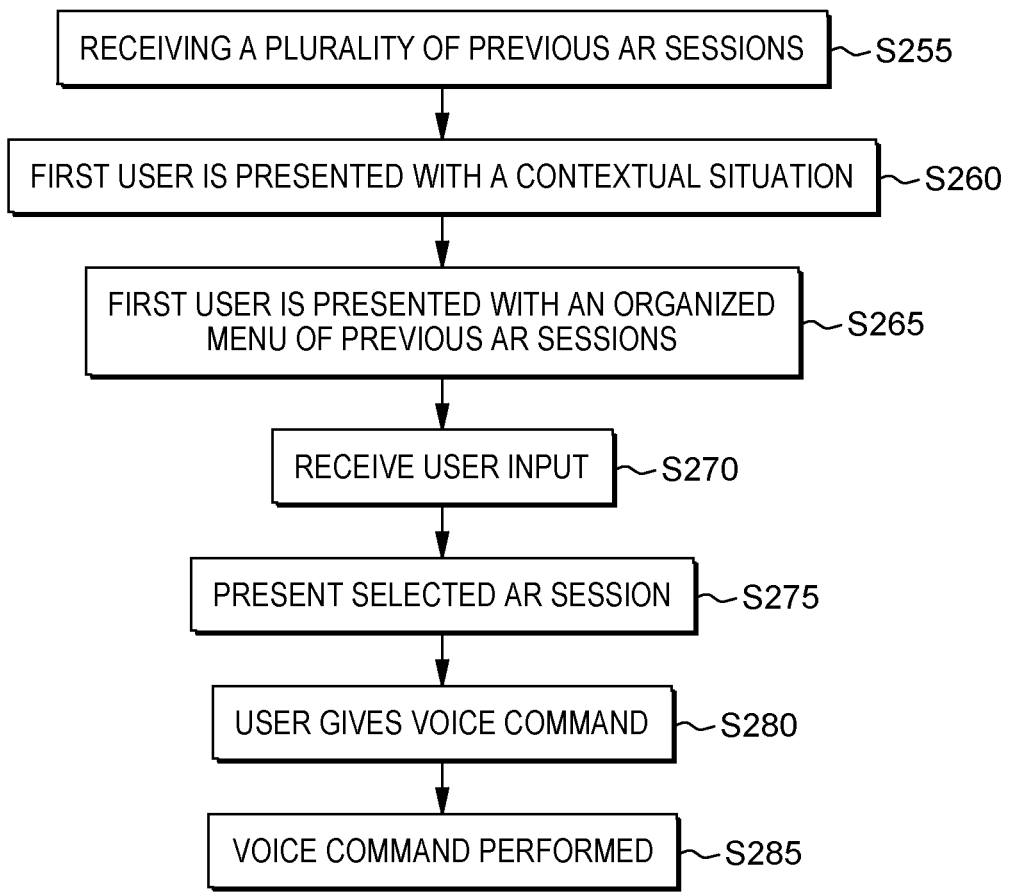
FIG. 2 is a flowchart showing a first embodiment method performed, at least in part, by the first embodiment system.
Figure 3:
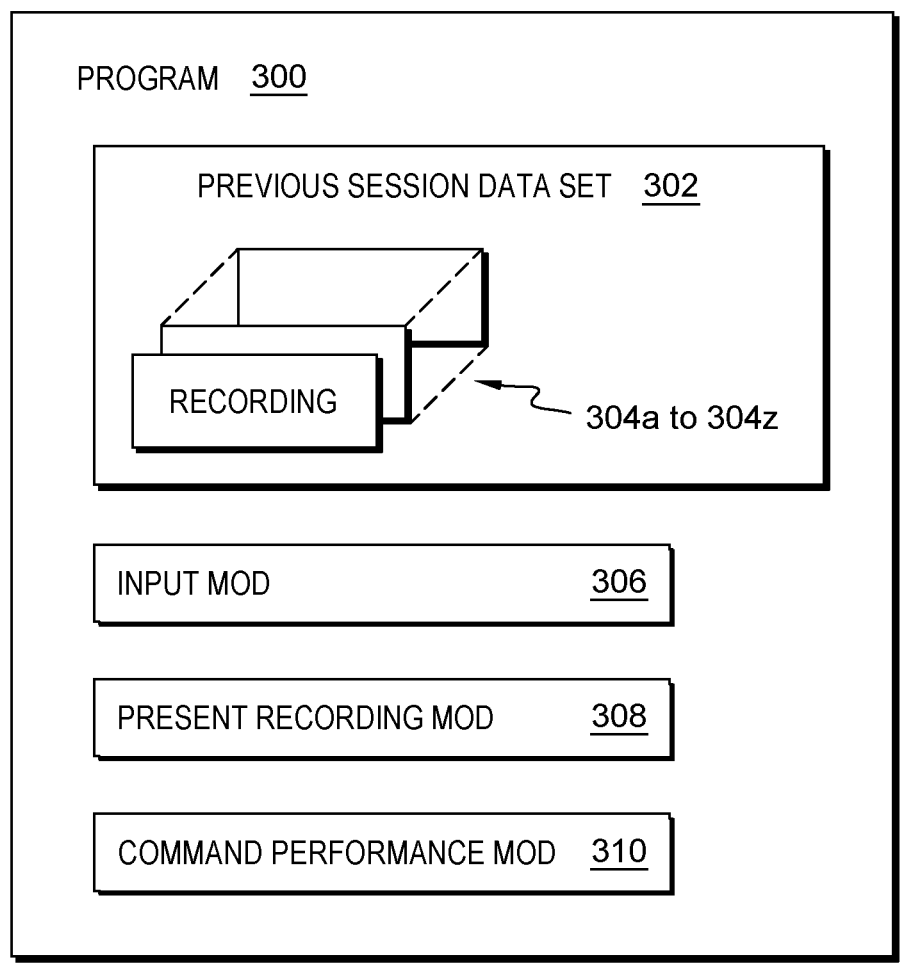
FIG. 3 is a block diagram showing a machine logic (for example, software) portion of the first embodiment system.

As shown in FIG. 1, networked computers system 100 is an environment in which an example method according to the present invention can be performed. As shown in FIG. 2, flowchart 250 shows an example method according to the present invention. As shown in FIG. 3, program 300 performs or controls performance of at least some of the method operations of flowchart 250. This method and associated software will now be discussed, over the course of the following paragraphs, with extensive reference to the blocks of FIGS. 1, 2 and 3.

Figure 4:
FIG. 4 is a screenshot view generated by the first embodiment system.

Processing begins at operation S255, where audio/video recordings of multiple previous AR sessions are received by program 300 as previous session data set 302 including twenty-six (26) previous session recordings 304a to 304z. The names of four (4) of these recorded sessions are shown in screenshot 400 of FIG. 4. Each previous session recording: (i) includes audio information indicative a set of voice command(s) uttered during the session; (ii) includes respective responses, by AR subsystem 102, to each voice command of the set of voice command(s); and (iii) is stored in *.AVI format (or other common audio/video recording format). In this embodiment, all of the previous sessions have been recorded locally at AR subsystem 102. Alternatively, previous sessions may be received for other AR sub-systems, like client sub-system 104, which is an AR subsystem used by a spouse of human user 215 who is willing to share her recordings with AR subsystem 102.

Processing proceeds to operation S260, where human user 215 is presented with contextual situation 249. In this example, the contextual situation is as follows: the user has just had an eye exam and her pupils are dilated causing the sidewalk outside of the optometrist's office to appear very bright, almost painfully so. At this point in the method, the user wants to activate the tinting on her AR goggles in order to mitigate the ill effects of the perceived brightness.

Processing proceeds to operation S265, where present recording module ("mod") 308 displays a menu, in the display of goggles 217, of previously recorded AR sessions. This scrollable previous session menu is shown in screenshot 400 of FIG. 4. In this example, the display of the menu is activated through the user's utterance of the following voice command: "I am confused about voice commands."

Processing proceeds to operation S270, where input mod 306 receives first user input, through AR subsystem 102 and from human user 215. This first user input (in this example, some predefined finger(s) gesture), identifying a first AR session of the plurality of AR sessions. In this example, "sunny day session (undated)" (see screenshot 400) is selected by this first user input. The reason for this selection is that the user wants to have the tint function activated for her AR goggles 217. As shown in screenshot 400, this is one of the annotated commands issued and responded to during the undated sunny day session that has previously been recorded as previous session recording 304d.

Processing proceeds to operation S275, where present recording mod 308 presents human user 215 with previous session 304d through AR goggles 217. The playback can be sped up or slowed down, as is common when playing videos back on a computer, to help user 215 find the instance of the voice command that activated the goggle tint during the previous session. In this case, it is relatively easy to find the instance of the sought-after voice command because the video prior to the command is relatively bright, and the video after the instance of the voice command is relatively dark due to the tinting. In this example, the voice command to tint the goggles is the made up word "tinta-cadabra." So, user 215 re-learns this voice command during operation S265.

Processing proceeds to operation S280, where the user says "tinta-cadabara." This utterance is received through audio portion 213 of user interface portion 211 of AR subsystem 102.

Processing proceeds to operation S285, where command performance mod 310 sends out the appropriate signals and/or power to goggles 217 so that the goggles become tinted, and the tint cuts the brightness of contextual situation 249, and the user's eyes start to feel more comfortable and relaxed. The user heads off to her job as a school bus driver, secure in the knowledge that her vision is sound.

Some embodiments of the present invention may include one, or more, of the following features and/or operations: (i) organizing the plurality of AR sessions into a plurality of categories respectively corresponding to a plurality of contextual situations; (ii) presenting the first user with a list of the plurality of AR sessions in a manner that is organized by the plurality of categories; (iii) submitting the user's new voice command (for example, "tinta-cadabara") to an artificial intelligence voice assistance system for analysis with respect to the current contextual situation; (iv) enabling the first user to update/modify the selected voice command using finger gestures; and/or (v) receiving user input indicative of a desired playback speed, wherein the presentation of the first AR session is performed in a manner characterized by the desired playback speed.

III. Further Comments and/or Embodiments

A method according to an embodiment of the present invention includes the following operations (not necessarily in the following order): (i) utilizing a personal AI (artificial intelligence) system for predicting a user's voice command submission need; (ii) based on identified current contextual situation, using the AR/VR (augmented reality/virtual reality) capability to allow the user to navigate in the past to visualize what voice commands were submitted in the past for a same or similar contextual situation; (iii) enabling the user to navigate in the past in a time scale using the AR/VR device, wherein based on the selected time scale in the past, the AR/VR device creates an appropriate simulated contextual environment from the previous/past submitted voice commands; and (iv) gathering Internet of Things (IoT) feeds from the surrounding, weather parameters, etc. along with user's voice command, while submitting each voice command, identifying the current contextual situation based on the analysis of this data and simulating the contextual situation in the AR/VR surrounding.

A method according to an embodiment of the present invention includes the following operations (not necessarily in the following order): (i) enabling the user to perform virtual or physical mobility and gesture-based interaction while navigating in the past, and accordingly the user can navigate in different time scales in the past and visualize the different contextual scenarios of the past when the voice commands were submitted; (ii) enabling the user to visualize voice to text translated voice commands which were submitted in the past, and accordingly enabling the user to select one or more submitted voice commands from the past contextual situation, and submit the same to an AI voice assistance system for the current contextual situation; and (iii) enabling the user to update/modify the selected voice command using finger gestures while selecting voice commands from the past having same or similar contextual situation and submitting the same to the AI voice assistance system for the current contextual situation.

Some embodiments of the present invention may include one, or more, of the following operations, features, characteristics and/or advantages: (i) includes a voice assistance system; (ii) includes AR/VR; (iii) navigates to past voice commands through the AR/VR to: (a) understand the context of similar situations, and (b) re-uses the same commands/actions; (iv) navigates to past voice commands so that the same command can be re-used if the current context/situation is the same; and/or (v) has the ability of updating/modifying voice commands.

Some embodiments of the present invention may include one, or more, of the following operations, features, characteristics and/or advantages: (i) user can use head mounted augmented reality glasses to navigate to past similar contextual situations that exist now; and/or (ii) identifies what commands were submitted, and accordingly, the user can select the appropriate voice commands from the past, then modify and submit them to an AI voice assistance system.

Some embodiments of the present invention recognize the following facts, potential problems and/or potential areas for improvement with respect to the current state of the art: (i) AI voice assistance systems are getting very popular; (ii) users can submit voice commands and accordingly the commands will be executed; and/or (iii) the voice commands can be automated for obtaining search results.

Some embodiments of the present invention recognize the following facts, potential problems and/or potential areas for improvement with respect to the current state of the art: (i) AR is also getting very popular; (ii) users can interact with digital content while navigating AR content; and/or (iii) users can also interact with an AR object with various types of interaction (for example, eye-based interaction, gesture-based interaction, etc.).

Some embodiments of the present invention recognize the following facts, potential problems and/or potential areas for improvement with respect to the current state of the art: (i) while interacting with AI voice assistance systems, users may have to submit the same or similar voice commands that have been submitted before; (ii) contextual situations can also be the same, meaning the user has to recall similar contextual situations and what commands were submitted; and/or (iii) creates a problem for the user to recall past situations, and to rethink what voice commands were need and submitted.

Some embodiments of the present invention may include one, or more, of the following operations, features, characteristics and/or advantages: (i) personal AI systems will be predicting the user's voice command submission, and accordingly, based on the identified current contextual situation, the system will use augmented/virtual reality capability to allow the user to navigate in the past to visualize what voice commands were submitted for the same or similar contextual situations; and/or (ii) using an AR/VR device, users can navigate in the past, along with a time scale based on the selected time scale in the past, where the AR/VR device will be creating an appropriate simulated contextual environment when the user has submitted the voice command in the past.

Some embodiments of the present invention may include one, or more, of the following operations, features, characteristics and/or advantages: (i) while submitting each voice command, the system will also be gathering IoT (internet of things) information from the surroundings (for example, weather parameters, etc.) along with user's voice command; and/or (ii) using analysis, the contextual situation can be identified, and can be used for simulating the contextual situation in AR and VR surroundings.

Some embodiments of the present invention may include one, or more, of the following operations, features, characteristics and/or advantages: (i) while navigating in the past, users can perform virtual or physical mobility or can also perform gesture-based interaction; and/or (ii) users can navigate in a different time scale in the past and visualize the different contextual scenarios of the past when voice commands were submitted.

Some embodiments of the present invention may include one, or more, of the following operations, features, characteristics and/or advantages: (i) users can visualize voice to text translated voice commands which were submitted in the past; (ii) users can select one or more submitted voice commands from the past contextual situation and select the same for submitting to an AI voice assistance system for current contextual situations; and/or (iii) while selecting voice commands from the past that have the same or similar contextual situations, the user can update or modify the selected voice commands with a finger gesture and can submit the same to an AI voice assistance for the current contextual situation.

Some embodiments of the present invention may include one, or more, of the following operations, features, characteristics and/or advantages: (i) the user can use an AR system to navigate in the past and visualize the voice command submitted in the past; and/or (ii) users can select one or more voice commands, modify and submit the commands directly to an AI voice assistance system without reading or speaking out the voice command.

A method according to embodiments of the president invention will now be described in the following four (4) paragraphs/implementation operations.

While the user is submitting voice commands, the system will receive the voice commands, along with various other information (for example, the system will also be gathering information from the surrounding IoT and wearable devices). In this case, the IoT device can be any home appliance, thermostat, weather parameter measurement system, contents that is being played, such as a movie, text reading, etc. The system will also be gathering biometric information of the participants along with the number of participants. Historically, the voice command, associated IoT information, and any wearable device feed information, will also be gathered. Based on the gathered IoT information, wearable and content specific information, along with the voice commands, will be analyzed to identify the contextual situation of the submitted voice command. While receiving the voice commands, the system will also be identifying the time and location of the voice commands.

The system will be identifying the contextual situation along with the voice command, data, and time of submitting of the voice command, etc. If the user captures photographs or video of the event, like a family get-together etc., this can also be shared with the AT voice assistance system for building and recreating the context. While creating the context, the system will be recognizing each and every device individually and will be identifying what sensor value is captured, etc. The system will have a context recreation engine, where the context recreation engine will be receiving the sensor feed for the context and will be simulating similar environments. The context recreation engine will be creating a visualization of the context so that the user can understand what contextual situation is selected. Based on historical learning, the user can specify the need of submitting voice commands to an AI voice assistance system. After submitting the wakeup command, or by identifying the user's change in behavior, the system can identify if the user wants to submit a voice command.

If the system identifies the user needs to submit voice commands, then the system will obtain the IoT and wearable device from the surroundings and from the user. The system will also be identifying any content consumption specific information. The system will be predicting the current contextual situation when the user wants to submit voice commands. The AI voice assistance system will identify similar contextual situations in the past. The past contextual situations, and timeline will be identified, along with the voice commands from the past contextual situation. The context simulation engine will be creating a visualization of the past scenario and will be showing the same in the AR and VR world. The system will be identifying all possible contextual situations in the past and will be showing the same in a time scale for user to select.

The user can perform virtual and physical mobility in the simulated contextual situation in the past and can visualize the past contextual situation. The user can visualize the voice commands submitted in the past and accordingly allow the user to select them. The user can select one or more voice commands from the past and can edit the commands for the current context situation. Once the voice command is updated, the user can then submit the same to an AI voice assistance system for execution.

Some embodiments of the present invention may include one, or more, of the following operations, features, characteristics and/or advantages: (i) adds state to the stateless voice command assistant; (ii) provides storage to record unique device actions on a particular day from all IoT devices and also set of voice commands associated with an ability to navigate past AR experiences; (iii) has the ability to recreate a future state based on the repetitive events occurring on the same situation like a birthday/anniversary, etc.; (iv) has the ability to tag a special command and store it manually (for example, anniversary, birthday, etc.); (v) the tagged context can be recreated again; and/or (vi) has the ability to scroll for actions through the AR tool and recommend it as a future action on that particular day/at the present time.

Some embodiments of the present invention may include one, or more, of the following operations, features, characteristics and/or advantages: (i) includes content aggregation; (ii) allows the user to move in a timescale for selecting required contextual situations in similar patterns; (iii) shows submitted commands so that the user can replicate the past contextual situation with the current contextual situation; (iv) allows the AI voice assistance system to receive the appropriate commands based on the user's interaction with the AR glass; (iv) the user can move in the timescale to select the appropriate context; (v) the user can move in the timescale to select the appropriate context, based on the current contextual situation; (vi) if there is multiple context, the context will be shown in a time scale so that the user can perform physical or virtual mobility in the timescale to select the appropriate commands from the AR glass; (vii) to navigate in the timescale, the user can perform physical mobility with the AR glass so the user's mobility direction and amount of movement can identify the appropriate location in the timescale; (viii) the IoT sensor can track the mobility and mobility direction; and/or (ix) the IoT sensor can also perform scrolling the timescale.

IV. Definitions

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein are believed to potentially be new, this understanding, as indicated by use of the term "present invention," is tentative and provisional and subject to change over the course of patent prosecution as relevant information is developed and as the claims are potentially amended.

Embodiment: see definition of "present invention" above—similar cautions apply to the term "embodiment."

and/or: inclusive or; for example, A, B "and/or" C means that at least one of A or B or C is true and applicable.

Including/include/includes: unless otherwise explicitly noted, means "including but not necessarily limited to."

Module/Sub-Module: any set of hardware, firmware and/or software that operatively works to do some kind of function, without regard to whether the module is: (i) in a single local proximity; (ii) distributed over a wide area; (iii) in a single proximity within a larger piece of software code; (iv) located within a single piece of software code; (v) located in a single storage device, memory or medium; (vi) mechanically connected; (vii) electrically connected; and/or (viii) connected in data communication.

Computer: any device with significant data processing and/or machine readable instruction reading capabilities including, but not limited to: desktop computers, mainframe computers, laptop computers, field-programmable gate array (FPGA) based devices, smart phones, personal digital assistants (PDAs), body-mounted or inserted computers, embedded device style computers, application-specific integrated circuit (ASIC) based devices.

What is claimed is:

1. A computer-implemented method (CIM) comprising:
   recording a plurality of augmented reality (AR) sessions between a set of user(s) and an AR computer system, with each recorded session including information indicative of: (i) a set of voice command(s) uttered during the session, and (ii) respective responses, by the AR computer system, to each voice command of the set of voice command(s);
   receiving first user input, through the AR computer system and from a first user, identifying a first AR session of the plurality of AR sessions; and
   presenting at least a portion of the recording of the first AR session on the AR computer system for the first user.

2. The CIM of claim 1 wherein:
   organizing the plurality of AR sessions into a plurality of categories respectively corresponding to a plurality of contextual situations; and
   presenting the first user with a list of the plurality of AR sessions in a manner that is organized by the plurality of categories.

3. The CIM of claim 1 wherein all of the plurality of recorded AR sessions were sessions involving the first user.

4. The CIM of claim 1 further comprising:
   subsequent to the presentation of the first session, receiving a new voice command from the first user and through the AR computer system, with the voice command being the same as a previous voice command uttered during the first AR session; and
   submitting the new voice command to an artificial intelligence voice assistance system for the current contextual situation.

5. The CIM of claim 1 further comprising:
   enabling the first user to update/modify the selected voice command using finger gestures.

6. The CIM of claim 1 further comprising:
   receiving a second user input indicative of a desired playback speed;
   wherein the presentation of the first AR session is performed in a manner characterized by the desired playback speed.

7. A computer program product (CPP) comprising:
   a set of storage device(s); and
   computer code stored collectively in the set of storage device(s), with the computer code including data and instructions to cause a processor(s) set to perform at least the following operations:
   recording a plurality of augmented reality (AR) sessions between a set of user(s) and an AR computer system, with each recorded session including information indicative of: (i) a set of voice command(s) uttered during the session, and (ii) respective responses, by the AR computer system, to each voice command of the set of voice command(s),
   receiving first user input, through the AR computer system and from a first user, identifying a first AR session of the plurality of AR sessions, and
   presenting at least a portion of the recording of the first AR session on the AR computer system for the first user.

8. The CPP of claim 7 wherein:
   organizing the plurality of AR sessions into a plurality of categories respectively corresponding to a plurality of contextual situations; and
   presenting the first user with a list of the plurality of AR sessions in a manner that is organized by the plurality of categories.

9. The CPP of claim 7 wherein all of the plurality of recorded AR sessions were sessions involving the first user.

10. The CPP of claim 7 wherein the computer code further includes instructions for causing the processor(s) set to perform the following operation(s):
subsequent to the presentation of the first session, receiving a new voice command from the first user and through the AR computer system, with the voice command being the same as a previous voice command uttered during the first AR session; and
submitting the new voice command to an artificial intelligence voice assistance system for the current contextual situation.

11. The CPP of claim 7 wherein the computer code further includes instructions for causing the processor(s) set to perform the following operation(s):
enabling the first user to update/modify the selected voice command using finger gestures.

12. The CPP of claim 7 wherein the computer code further includes instructions for causing the processor(s) set to perform the following operation(s):
receiving a second user input indicative of a desired playback speed;
wherein the presentation of the first AR session is performed in a manner characterized by the desired playback speed.

13. A computer system (CS) comprising:
a processor(s) set;
a set of storage device(s); and
computer code stored collectively in the set of storage device(s), with the computer code including data and instructions to cause the processor(s) set to perform at least the following operations:
recording a plurality of augmented reality (AR) sessions between a set of user(s) and an AR computer system, with each recorded session including information indicative of: (i) a set of voice command(s) uttered during the session, and (ii) respective responses, by the AR computer system, to each voice command of the set of voice command(s),
receiving first user input, through the AR computer system and from a first user, identifying a first AR session of the plurality of AR sessions, and
presenting at least a portion of the recording of the first AR session on the AR computer system for the first user.

14. The CS of claim 13 wherein:
organizing the plurality of AR sessions into a plurality of categories respectively corresponding to a plurality of contextual situations; and
presenting the first user with a list of the plurality of AR sessions in a manner that is organized by the plurality of categories.

15. The CS of claim 13 wherein all of the plurality of recorded AR sessions were sessions involving the first user.

16. The CS of claim 13 wherein the computer code further includes instructions for causing the processor(s) set to perform the following operation(s):
subsequent to the presentation of the first session, receiving a new voice command from the first user and through the AR computer system, with the voice command being the same as a previous voice command uttered during the first AR session; and
submitting the new voice command to a artificial intelligence voice assistance system for the current contextual situation.

17. The CS of claim 13 wherein the computer code further includes instructions for causing the processor(s) set to perform the following operation(s):
enabling the first user to update/modify the selected voice command using finger gestures.

18. The CS of claim 13 wherein the computer code further includes instructions for causing the processor(s) set to perform the following operation(s):
receiving a second user input indicative of a desired playback speed;
wherein the presentation of the first AR session is performed in a manner characterized by the desired playback speed.

* * * * *